(12) United States Patent
Rabe et al.

(10) Patent No.: US 11,214,154 B2
(45) Date of Patent: Jan. 4, 2022

(54) BATTERY SUPPORT OF MODULAR CONSTRUCTION

(71) Applicant: BENTELER AUTOMOBILTECHNIK GMBH, Paderborn (DE)

(72) Inventors: Frank Rabe, Hiddenhausen (DE); Peter Summerauer, Paderborn (DE); Thomas Guenther, Paderborn (DE); Christian Handing, Langenberg (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 206 days.

(21) Appl. No.: 16/704,346

(22) Filed: Dec. 5, 2019

(65) Prior Publication Data
US 2020/0180442 A1    Jun. 11, 2020

(30) Foreign Application Priority Data
Dec. 7, 2018 (DE) ..................... 10 2018 131 374.8

(51) Int. Cl.
| | |
|---|---|
| *B60K 1/04* | (2019.01) |
| *B60L 50/64* | (2019.01) |
| *B60L 58/26* | (2019.01) |
| *H01M 10/625* | (2014.01) |
| *H01M 10/6554* | (2014.01) |

(Continued)

(52) U.S. Cl.
CPC .............. *B60L 50/64* (2019.02); *B60L 58/26* (2019.02); *H01M 10/613* (2015.04); *H01M 10/625* (2015.04); *H01M 10/6554* (2015.04); *H01M 10/6556* (2015.04); *H01M 50/20* (2021.01); *H01M 50/249* (2021.01);
(Continued)

(58) Field of Classification Search
CPC ........... B60L 50/64; B60L 58/26; B60K 1/04; H01M 50/20; H01M 10/613; B62D 21/115
See application file for complete search history.

(56) References Cited

U.S. PATENT DOCUMENTS

| | | | | |
|---|---|---|---|---|
| 10,933,726 B2* | 3/2021 | Handing | ........... | H01M 10/6556 |
| 2010/0015512 A1* | 1/2010 | Inoue | ............... | H01M 10/6555 |
| | | | | 429/99 |

(Continued)

FOREIGN PATENT DOCUMENTS

| | | |
|---|---|---|
| DE | 102016114839 A1 | 2/2018 |
| DE | 102016125693 A1 | 6/2018 |
| DE | 102017109722 A1 | 11/2018 |

OTHER PUBLICATIONS

Office Action for German Application No. 10 2018 131 374.8 dated Sep. 19, 2019; 13 pp.

*Primary Examiner* — James A Shriver, II
*Assistant Examiner* — James J Triggs
(74) *Attorney, Agent, or Firm* — Hauptman Ham, LLP

(57) ABSTRACT

The invention relates to a battery support for an electric motor vehicle, having a tray for holding batteries, with a base and a peripheral side wall and a cover, wherein the cover is formed as a hood and the peripheral side wall is formed by a peripheral frame composed of hollow profiles, wherein the frame is coupled to a base, wherein the hood, in the closed state, is mounted on the hollow profile, and a cooling system is formed below the base, and in that a protective base is arranged below the base, in particular below the cooling system.

10 Claims, 19 Drawing Sheets

Figure 1:
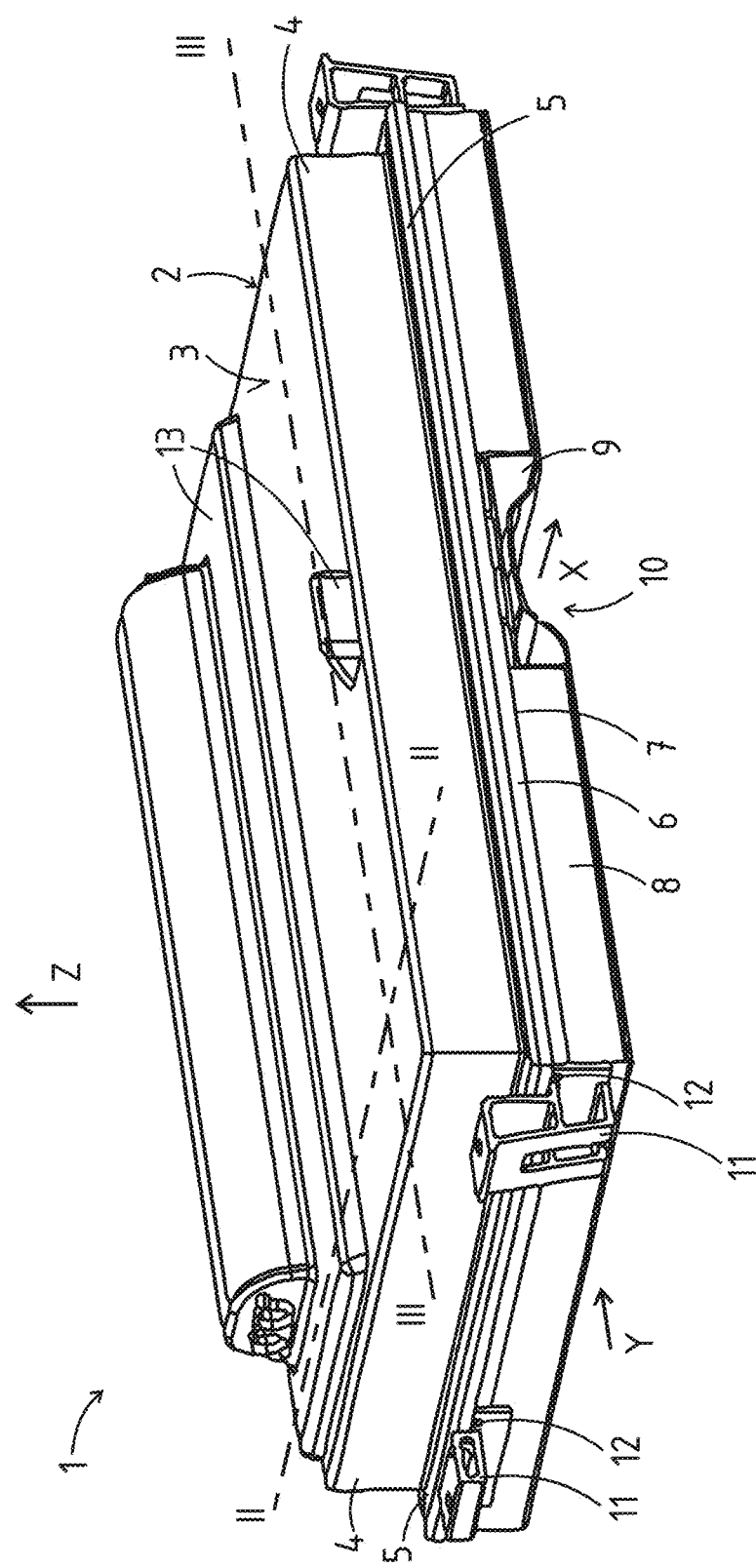

(51) Int. Cl.
  *H01M 10/6556*   (2014.01)
  *H01M 10/613*   (2014.01)
  *H01M 50/20*   (2021.01)
  *H01M 50/276*   (2021.01)
  *H01M 50/249*   (2021.01)
  *H01M 50/262*   (2021.01)
  *H01M 50/289*   (2021.01)

(52) U.S. Cl.
  CPC ....... *H01M 50/262* (2021.01); *H01M 50/276* (2021.01); *H01M 50/289* (2021.01); *H01M 2220/20* (2013.01)

(56) References Cited

U.S. PATENT DOCUMENTS

| | | | |
|---|---|---|---|
| 2012/0315528 A1* | 12/2012 | Rajaie | B60R 16/0238 |
| | | | 429/100 |
| 2015/0044540 A1* | 2/2015 | Morton | F28F 1/022 |
| | | | 429/120 |
| 2015/0171485 A1* | 6/2015 | Rawlinson | B60L 3/0046 |
| | | | 429/62 |
| 2015/0171486 A1* | 6/2015 | Rawlinson | H01M 10/613 |
| | | | 324/426 |
| 2015/0311485 A1* | 10/2015 | Fister | H01M 50/20 |
| | | | 429/151 |
| 2018/0212216 A1 | 7/2018 | Handing et al. | |
| 2019/0229311 A1 | 7/2019 | Guenther | |

\* cited by examiner

BATTERY SUPPORT OF MODULAR CONSTRUCTION

RELATED APPLICATIONS

The present application claims priority to German Application Number 10 2018 131 374.8 filed Dec. 7, 2018, the disclosure of which is hereby incorporated by reference herein in its entirety.

The present invention relates to a battery support of modular construction for an electric motor vehicle as per the features in the preamble of Claim 1.

In the use of motor vehicles, electric mobility has become increasingly relevant. In this case, electric motor vehicles are driven exclusively by electrical energy. For the purpose of storing said electrical energy in the electric motor vehicle, batteries, also referred to as accumulators, high-voltage batteries or traction batteries, which take up a considerable amount of volume and have a relatively high inherent weight, are necessary. In order that a sufficient amount of energy, for example for reaching a range of 300 km with one battery charge, can be stored, such batteries are arranged in the underfloor region of a motor vehicle. The batteries themselves are accommodated in a battery support such that, firstly, they are protected against external weather influences, and secondly, an escape of substances contained in the batteries to the surroundings is avoided.

In this respect, the prior art has disclosed battery housings which are produced from plastic materials, fiber composite materials or else from metallic materials. The battery supports are also referred to as "battery trays".

Such a battery housing is normally fitted to a motor vehicle from below and extends crucially over a large part of the motor vehicle width and likewise over part of the motor vehicle length.

The battery housing consists substantially of a battery support and a housing cover.

A battery support is distinguished by a tray-like housing in which a plurality of batteries are arranged. In order that a corresponding stiffness of the battery support is ensured, there is arranged peripherally at the outside a frame composed of a hollow profile, which at the same time can also function as a peripheral wall of the tray. A battery support is arranged in the non-visible underfloor region of the motor vehicle. The requirements with regard to leak tightness and the production tolerances are high. The production costs of the battery support are however subject to massive cost pressure.

The tray-like battery support of a battery housing is produced as a sheet-metal shaped component in some cases. A document forming the generic type in this respect is US 2016/0263639 A1.

In this case, however, problems arise in the corner regions during shaping by bending, or deep drawing, with regard to leak tightness and maximum use of interior space.

It is the object of the present invention to provide a battery support which, with regard to its outlay in terms of manufacture, is improved in comparison with battery supports known from the prior art, with optimum use of interior space.

According to the invention, the object is achieved by a battery support for an electric motor vehicle as per the features in Claim 1.

Advantageous configuration variants of the invention are described in the dependent claims.

The battery support is designed for an electric motor vehicle and has a tray for holding batteries. The tray has a base, and also a peripheral side wall and a cover. The peripheral side wall, in plan view, may be of rectangular form, but may also be of polygonal, for example hexagonal or octagonal, form, and so the battery support, in plan view, may have a trapeziform shape or a combination of a trapeziform shape and rectangular shape.

According to the invention, the battery support is distinguished in that it is of modular construction. For this purpose, provision is made for the peripheral side wall to be formed by a peripheral frame composed of hollow profiles. For this purpose, individual hollow profile pieces, preferably produced by extrusion from a light metal alloy, are coupled to one another in the corner regions formed, in particular by thermal joining. A peripheral side wall is thus obtained from the frame, wherein the peripheral side wall, in cross section, is formed as a hollow profile.

The peripheral side wall is then coupled to a base. The base is formed in particular as a base sheet, preferably from a metallic material.

A cover is then mounted on the frame itself. The cover is formed in particular as a hood. In this way, it is advantageously achieved that the frame itself does not have to cover the full height of the interior space available for holding batteries, but rather the interior space height for holding the batteries is also partly achieved by the cover as hood. In the closed state, the hood is mounted on the hollow profile of the frame.

Furthermore, below the base, a cooling system is arranged, and, again below the base, in particular below the cooling system, a protective base is arranged.

Due to the modular construction, the battery support allows an inexpensive possibility for manufacture, and a correspondingly high freedom of design with regard to the external conditions through the electric motor vehicle into which the battery support is inserted, and also with regard to the interior space in which the batteries are to be arranged. Due to the cooling system arranged below the base, it is furthermore possible for the required cooling power to be switched off. Furthermore, a safety aspect is increased in that a protective base is arranged below the cooling system such that, in the event of a ground obstacle being driven over, damage is sustained at most by the protective base, and not by the cooling system, and in particular not by the batteries. Due to the modular construction, it is then possible, as a repair measure, for the protective base to be replaced. It is not necessary for the entire battery support with batteries to be replaced.

The hood itself is produced from metallic material as a cast component or as a fold component from a sheet metal. In the latter case, firstly a pre-cut sheet-metal blank is produced, and then the geometric shape of a hood is produced by folding or edge bending. The sheet metal parts subjected to edge bending are then thermally joined in the corner regions formed, in particular such that the hood is formed in a sealed manner.

The coupling of the hood to the frame and the frame to the base, in each case preferably with a seal and/or a sealing agent being introduced, consequently results in the interior space of the battery support being sealed off with respect to the surroundings. Weather influences, for example moisture, therefore do not enter the interior space of the battery support. Generated steams or else liquids of the batteries in turn do not pass to the surroundings.

Corresponding charging electronics and electrical connections can then be guided through the cover, and also guided through the frame or the base, so as to connect the batteries arranged in the interior space to the electric motor vehicle, in particular to a drive of the electric motor vehicle.

The cooling system is formed by a cooling duct plate which is coupled to the base in a fluid-tight manner. The cooling duct plate may preferably also be of single-layer form and have corresponding embossments such that cooling ducts for the passage of a fluid are formed when the cooling duct plate and the base are coupled. The cooling ducts may also be used for the heating of the battery support.

For particularly simple manufacture, it is furthermore possible for the hollow profile of the frame to be screwed to the base, with a sealing compound being introduced. Slight manufacturing tolerances are compensated for by the sealing compound and the screwing, high precision with respect to leak tightness and outer geometrical dimensions being obtained at the same time however owing to the inherent stiffness of the frame.

The hollow profile of the peripheral frame may furthermore have a protruding web at its top side, and/or may have a protruding web at its bottom side, such that, when the hollow profile is coupled to the hood and the hollow profile is coupled to the base, a defined gap remains.

It is also additionally possible for the cooling duct plate to be screwed together with the base and with the hollow profile of the frame.

The protective base itself is in turn formed from hollow profiles. The hollow profiles are likewise preferably produced in an extruded manner and have in particular a specific height in the motor vehicle vertical direction, in particular greater than 3 cm, preferably greater than 5 cm. The height in the motor vehicle vertical direction should not exceed 20 cm. Particularly preferably, the hollow profiles of the protective base are approximately 5 to 10 cm high in the motor vehicle vertical direction.

The individual hollow profiles of the protective base are in particular plugged one into the other by means of a tongue and groove plug-in system. In this way, it is possible for the hollow profiles firstly to be produced by extrusion, and then, by way of the tongue and groove plug-in system, to be joined together to form, in plan view, a large surface, such that the battery support, from the underside, is covered in a large-area manner by the protective base.

Preferably, it is also still possible for an underride guard plate to be arranged below the protective base. In the event of an obstacle, for example a stone or curbstone, being driven over, said underride guard plate distributes to the hollow profiles the forces to be introduced.

It is furthermore possible for provision to be made of a cover plate laterally with respect to the protective base, in particular the hollow profiles. The battery support for an electric motor vehicle preferably has a tray and/or hood. The tray and/or hood are/is in each case of tray-like configuration. This means each of the components has a base and a peripheral side wall which protrudes with respect to the base. The side wall in this case projects or protrudes in particular at an angle of approximately 90° with respect to the base.

On the side wall, in particular on the upper end of the side wall, a projecting flange is in turn formed in an outwardly oriented manner. The flange, with respect to the side wall, likewise projects at substantially 90°.

The battery support then has batteries which are arranged in its interior space. The tray or hood is in each case closed off by a cover. It is also possible for a tray and a hood to be used together at a battery support.

For improved production, provision is now made for the tray and/or the hood to be produced as a fold component in an integral and materially uniform manner from a metallic blank. If a tray and a hood are used at a battery support, then each component is produced from a blank.

In particular, use is made for this purpose of an aluminum material which has a wall thickness of between 1.5 mm and 2 mm. Use may also be made of a steel material, however. This preferably has a wall thickness of between 0.8 mm and 2 mm, in particular between 1 mm and 1.5 mm.

According to the invention, the tray or the hood is consequently not produced as a deep-drawn component from the metallic material, but as a fold component. This means, firstly a pre-cut of the blank is produced, and subsequently the respective projecting regions are then shaped by folding or bending, also referred to as edge bending. Generally, the parts, which yield the peripheral side wall at a later stage, are thereby bent or folded with respect to the base.

Projecting in turn from the side wall is then the flange.

Between in each case two side wall parts, there is consequently formed a corner region, which, in particular with respect to fluids or gases in the interior space and also external weather influences, is not sealed off and, structurally, does not provide any mutual connection. For this purpose, provision is now made according to the invention for or a weld seam arranged at the inside to be formed in an interior space. It has in this case been found according to the invention that a particularly high quality of the weld connection with regard to the mechanical connection produced by materially bonded joining, and also to the leak tightness which is thereby achievable, is achieved if the weld seam does not start exactly in a corner of the corner region, that is to say between the base and the two side walls, prior to running over the side walls, but if the weld seam starts already from an offset with respect to the corner. Consequently, the weld seam, starting between the side wall and the base, is drawn as a continuous weld seam over the corner region as far as the flange. According to the invention, it has been found to be particularly preferable if the weld seam starts in this region already 1 cm, in particular 2 cm, before the actual corner. The weld seam is then drawn further along the entire corner region between the two side wall parts. In particular, the flange projects outward. Here, the weld seam is preferably drawn through further as far as the outer end of the flange. The welding is preferably realized as MIG/CMT welding. Particularly preferably, the quality of the weld connection can be improved by an inlet zone, starting between the side wall and the base, and an outlet zone on the flange, which is removed by subsequent mechanical rework.

Here, an additional or alternative improvement has become evident. The flange is used not only for coupling to further components, but also as a resulting sealing flange. It has in this case been found to be advantageous according to the invention if the end of the flange, in the region of the weld seam, is firstly formed to be longer or to project further, the flange here accordingly protruding further with respect to the side wall or projecting further therefrom. The weld seam is consequently firstly drawn through as far as the end of this further portion. Subsequent to this, mechanical work, in particular cutting mechanical work, is performed on the flange, and thus also on the outer end of the flange. The end of the flange that then results after the work is of particularly high quality in terms of connection particularly in the region of the weld seam of the two mutually joined flange regions.

For further improvement of the present invention, it is possible for at least one joining clip to be formed on a side wall, which joining clip, after the folding process, then overlaps the adjacent side wall at the outside, and for the joining clip and the overlapped side wall to furthermore be joined to one another. For this purpose, a bonding process may be used, it also being possible however to use a welding process. A spot-welding process has proven to be particularly advantageous here. The mechanical strength is further increased by said joining clip. In connection with the weld seam arranged at the inside, in particular in relation to leak tightness and mechanical strength, it is thus possible for both requirements to be satisfied very well.

In addition to the weld seam, it has been found to be furthermore advantageous if a sealing seam composed of sealing material, in particular a sealing bead, is applied from the inside to the weld seam. For example, it is possible here for use to be made of a sealing material which cures in a permanently elastic manner on the basis of an elastomer or on the basis of a silicone. In particular, after completion of the welding process and, if appropriate, further processing steps, a sealing seam is then furthermore applied in an overlapping manner to the weld seam.

It has furthermore been found to be advantageous if a fold or a step is additionally arranged on the flange at the outside. In particular if the aforementioned fold component is used as a hood, the hood can cover a base sheet or a frame. The flange comes into abutment as a seal flange. The additional fold or the additional step can then, in particular in an installation situation, act in an over-engaging manner in the motor vehicle vertical direction, and center the hood on the frame or the base sheet in the motor vehicle transverse and/or longitudinal direction.

Furthermore, function points may be integrated in the base. The base may have for example a cutout, and an additional device support or a device hood may be arranged thereabove.

It is also possible that, in the base of the hood or tray itself, a formation or bulge is produced in an integral and materially uniform manner. Precisely by virtue of the fact that no additional load acts on the base as a result of the shaping of the side walls and the flange, a relatively high degree of shaping in the region of the base is possible here. Only afterwards can the side walls and flanges then be produced by application of folding technology.

The present invention thus also relates to a battery support which has a base sheet which is arranged at the bottom in the installation direction in the motor vehicle with respect to the vertical direction. The above-described hood is then mounted on the base sheet. The batteries are arranged in the resulting interior space between the base sheet and the hood. These may preferably be positioned on the base sheet. In this way, good heat transfer from the batteries to the base sheet is made possible.

The base sheet therefore has in particular a cooling system. The cooling system is produced in particular through coupling of the base sheet to a cooling duct plate. The cooling duct plate has three-dimensional bulges. The coupling of the cooling duct plate and the base sheet results in the provision of cooling ducts due to the bulges, through which cooling ducts a cooling fluid is able to be conducted. Here, it is in particular the case that the base sheet and the cooling duct plate are soldered to one another. Alternatively, the base sheet and the cooling duct plate may be coupled to one another by roll bonding. The subject of the invention, according to which a base sheet is arranged with a cooling duct plate coupled thereto in a battery support, may also be regarded as an independent concept of the invention. Particularly preferably, multiple, in particular three, cooling duct plates are arranged one next to the other in the motor vehicle longitudinal direction. Here, individual cooling duct plates are coupled to one another by way of a base plate, and accordingly a base sheet. This coupling procedure may be produced by soldering or roll bonding. Here, it is advantageous that only one large-area base sheet has to be arranged. The respective cooling power can then be removed in a targeted manner by individual cooling duct plates. Conduction of heat from the battery modules within the battery support is realized via the base sheet and then to the cooling medium which flows through the cooling ducts formed between the base sheet and the cooling duct plate. In particular, this independent concept of the invention may then be combined with the underride protection, in the form of hollow profiles, described below.

Furthermore, it is particularly preferably possible for a peripheral frame to be arranged between the base sheet and the housing cover or the hood, in particular flange of the hood. The peripheral frame is produced in particular from extrusion profiles. Said frame serves as an impact damper and as a spacer for protecting the accumulators or cells and also for increasing the stiffness of the battery support and for connection or installation into the electric motor vehicle. The frame preferably has a spacer, in particular in the form of a linearly peripheral spacing boss which is formed integrally on the frame. Between the frame surface and the flange, or the frame surface and the base sheet, the spacing boss results in particular in a sealing gap. An adhesive and/or sealant may additionally be arranged in said sealing gap. The spacing boss serves immediately as an electrically conductive contact between flange, frame and base sheet too. The frame, which itself is preferably likewise produced as an extrusion component, can thus provide a bumper and impact damper arrangement in particular by way of the hollow profiles described below in the region of the base. The frame itself can peripherally intercept objects impinging in the motor vehicle longitudinal direction or motor vehicle transverse direction in terms of their thrust and kinetic energy, or convert the kinetic energy thereof into deformation work. The frame accordingly deforms according to the mode of action of a folding impact damper. The hollow profiles arranged at the bottom in the installation situation serve as underride protection and likewise deform, in the event of contact of the electric motor vehicle or of the battery support with an underlying surface or with an object impacting against the battery support from below, according to the mode of action of a folding or compressing impact damper. The lateral frame and the hollow profiles arranged at the bottom thus form the protection against impacts and against the infiltration of foreign bodies into the battery housing. The arrangement with laterally peripheral frame and hollow profiles arranged at the bottom may also be regarded as an independent concept of the invention.

It is furthermore possible according to the invention for hollow profiles extending transversely with respect to the travel direction or in the motor vehicle longitudinal direction to be arranged below the base sheet, in particular below the cooling duct plate. The hollow profiles serve firstly as crash protection or as a load path with respect to a lateral collision. At the same time, however, the hollow profiles serve as collision protection or underride protection if the electric motor vehicle, during operation, sets down on uneven ground from below. The hollow profiles consequently act in a reinforcing manner in the motor vehicle transverse direction. In the motor vehicle vertical direction, said hollow profiles serve in accordance with the principle of a crash absorber or crash protection with regard to an infiltration of objects from below. The hollow profiles may be formed in accordance with the principle of panels, which are coupled to one another in particular by way of a tongue and groove plug-in system. It is thus possible for the hollow profiles to be produced by extrusion. These have a relatively small extrusion width, and have a groove at one side and a tongue at the opposite side. Multiple hollow profiles may now be arranged in a row one behind the other via the tongue and groove plug-in system such that the base region of a battery support can be covered areally by more than 1 m², in particular more than 2 m². In the context of the invention, it is also possible for cooling ducts to be integrated directly into these extruded hollow profiles. Accordingly, during the extrusion process, hollow chambers are formed at the same time, through which hollow chambers a cooling fluid is conducted at a later stage. In an installation situation, the hollow profiles with the cooling ducts would then bear directly against the base of the battery modules in order for heat generated here to be transferred to the cooling fluid by means of heat conduction and then removed via the cooling fluid.

In the hollow profiles, a tunnel may be formed, in turn extending in the motor vehicle longitudinal direction. Said tunnel serves for example for the passage of an exhaust-gas system if no pure electric motor vehicle is involved, but rather a motor vehicle which additionally has an internal combustion engine. Furthermore, a heat shield sheet may be arranged in the tunnel. The heat shield sheet itself may also be produced as an extrusion component. This then extends with its hollow chambers in the motor vehicle longitudinal direction. The heat shield sheet then serves at the same time as a means for connecting hollow profiles arranged at the left side and right side with respect to the motor vehicle transverse direction, so as to make possible a load path in the motor vehicle transverse direction despite the interruption of the tunnel.

Figure 2:
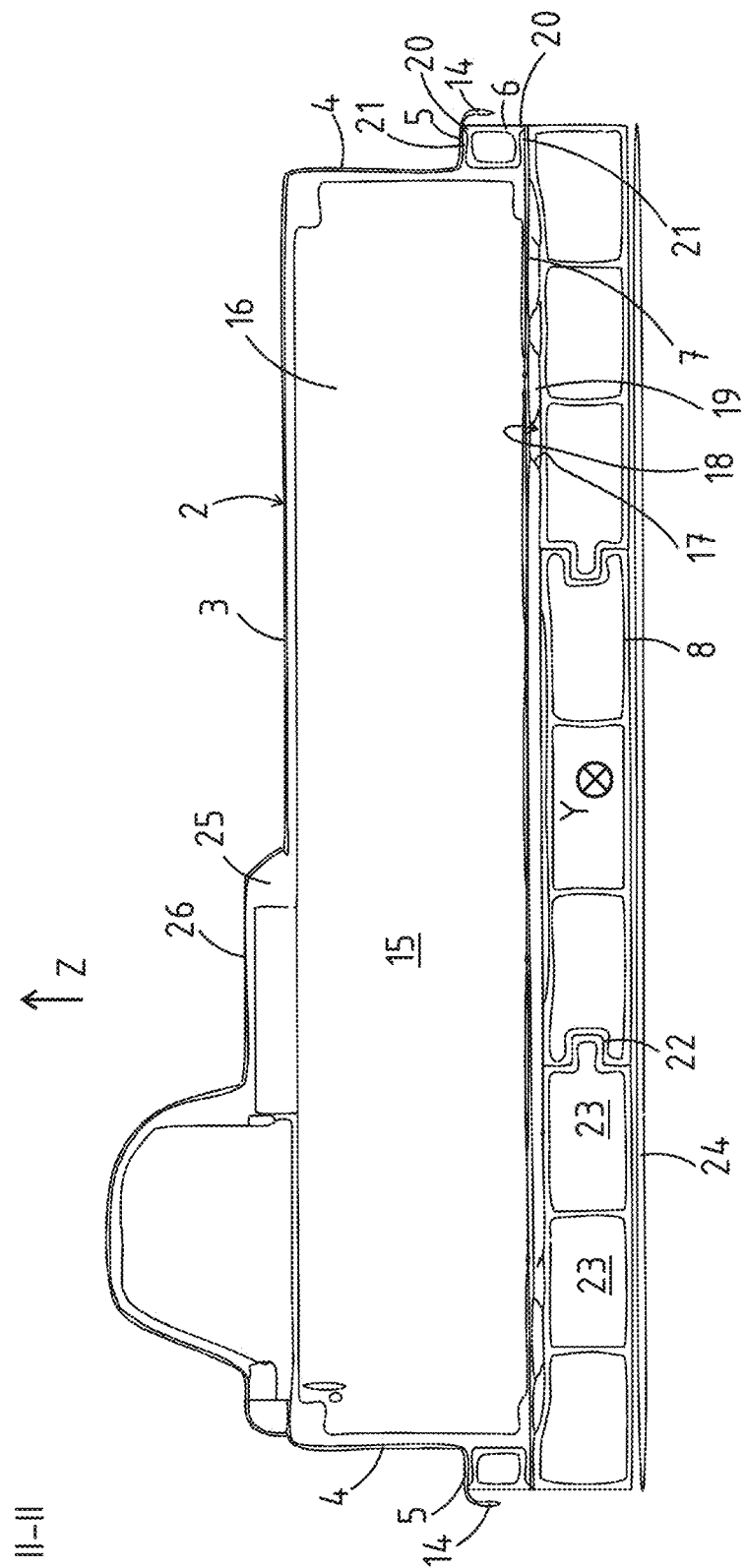
Figure 3:
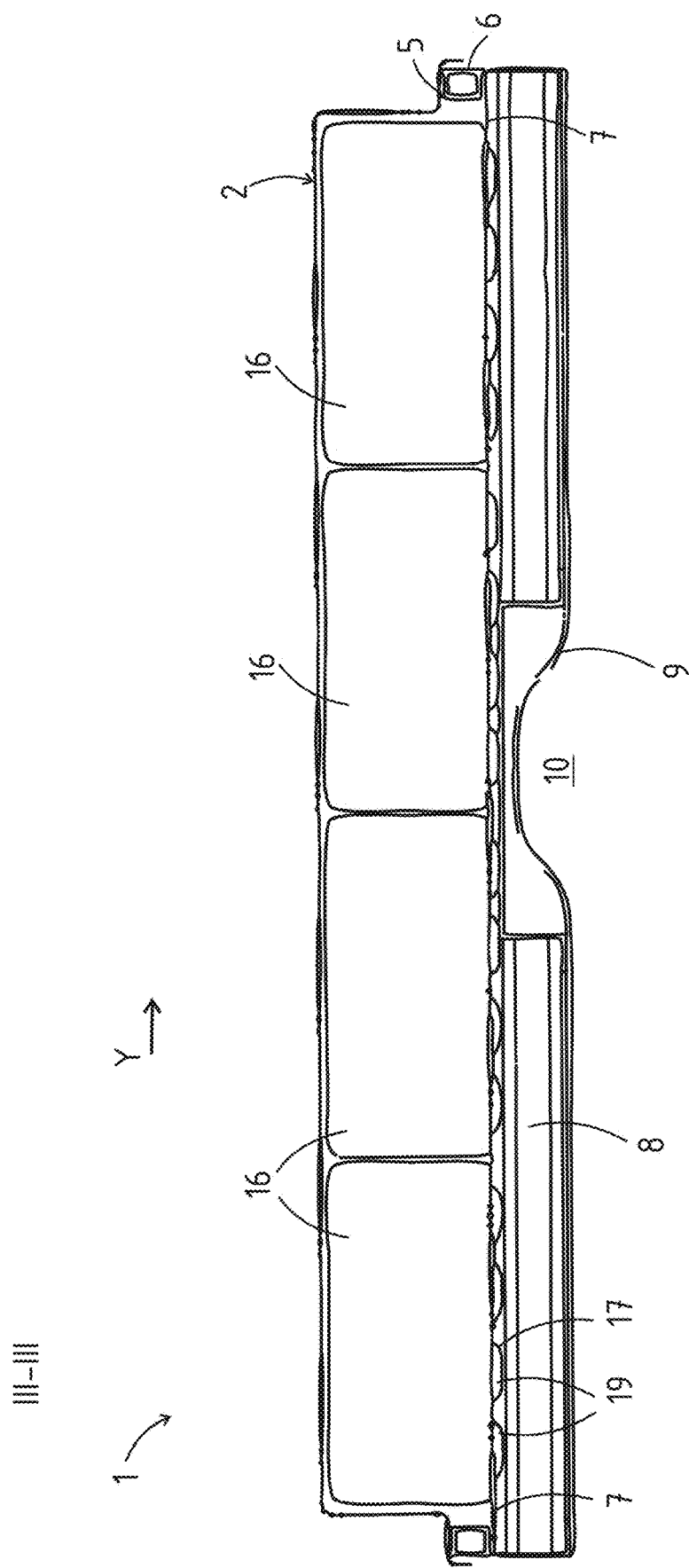
Figure 6:
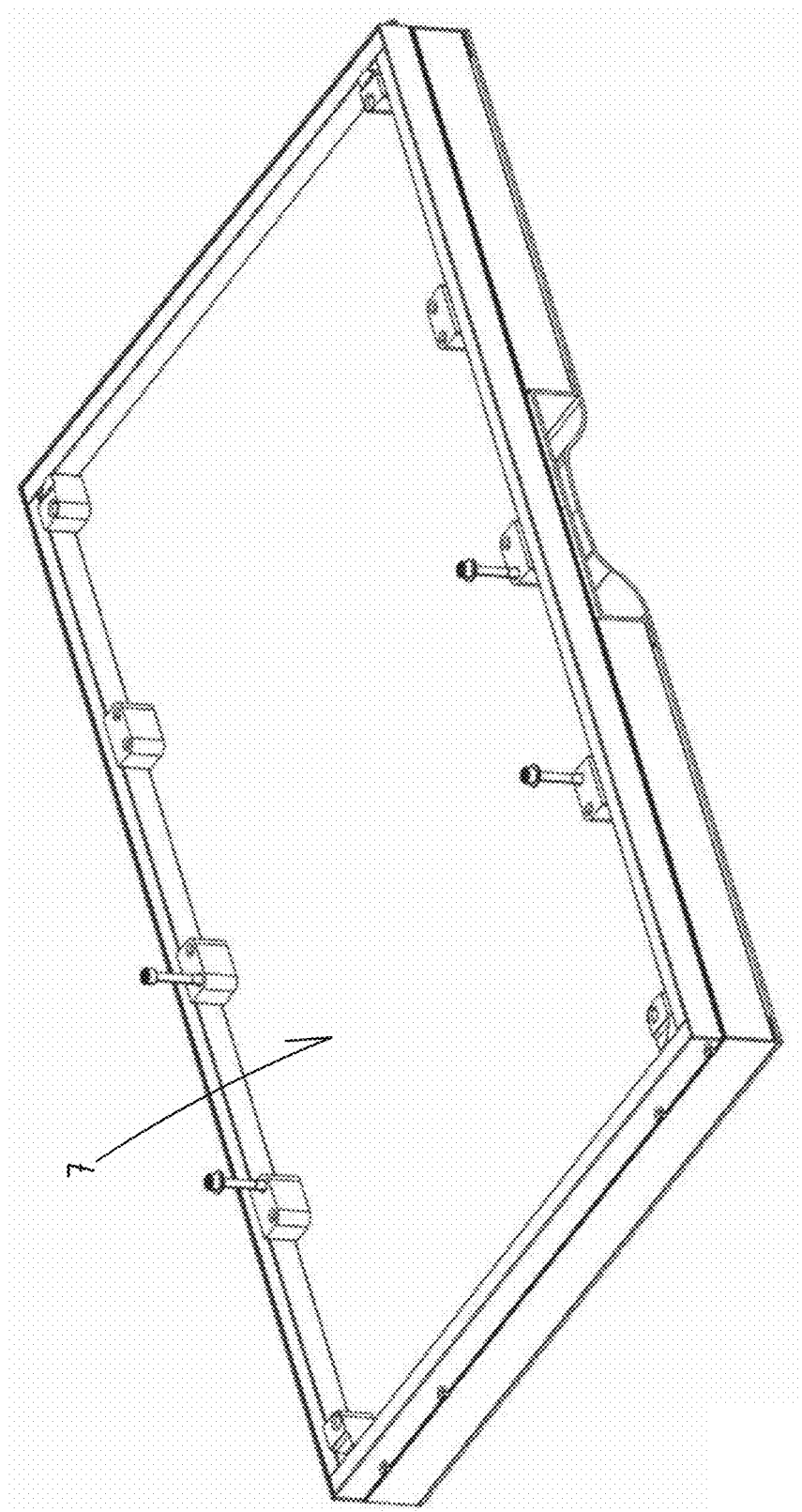
Figure 7:
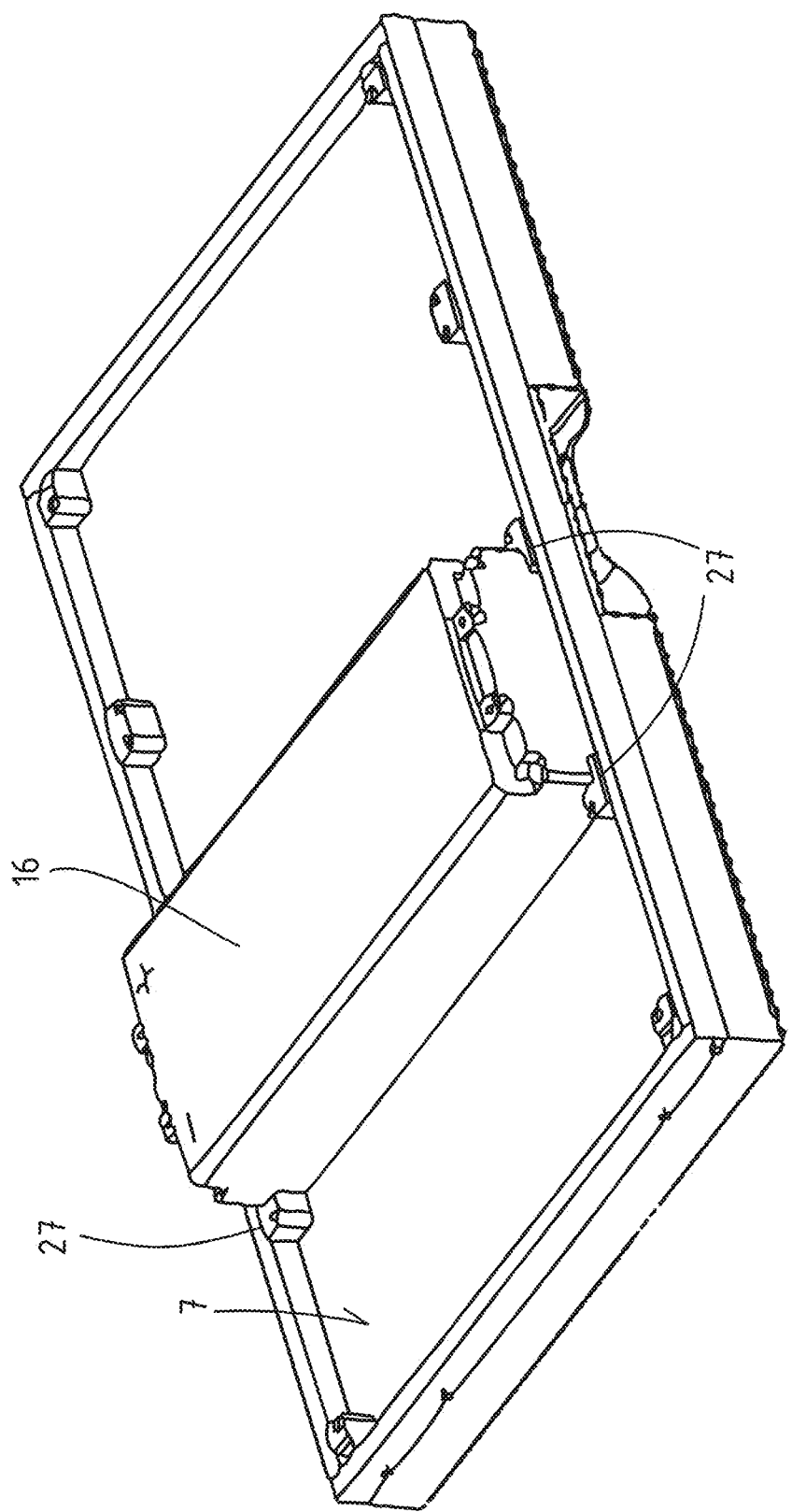
Figure 8:
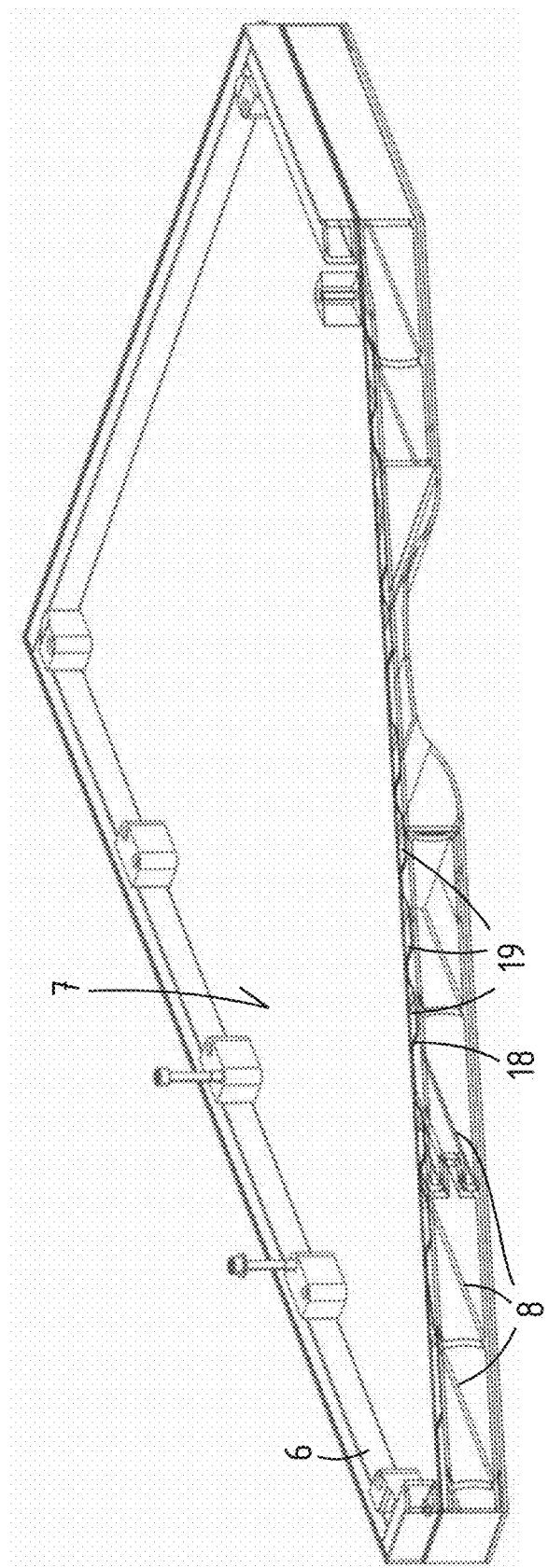
Figure 9:
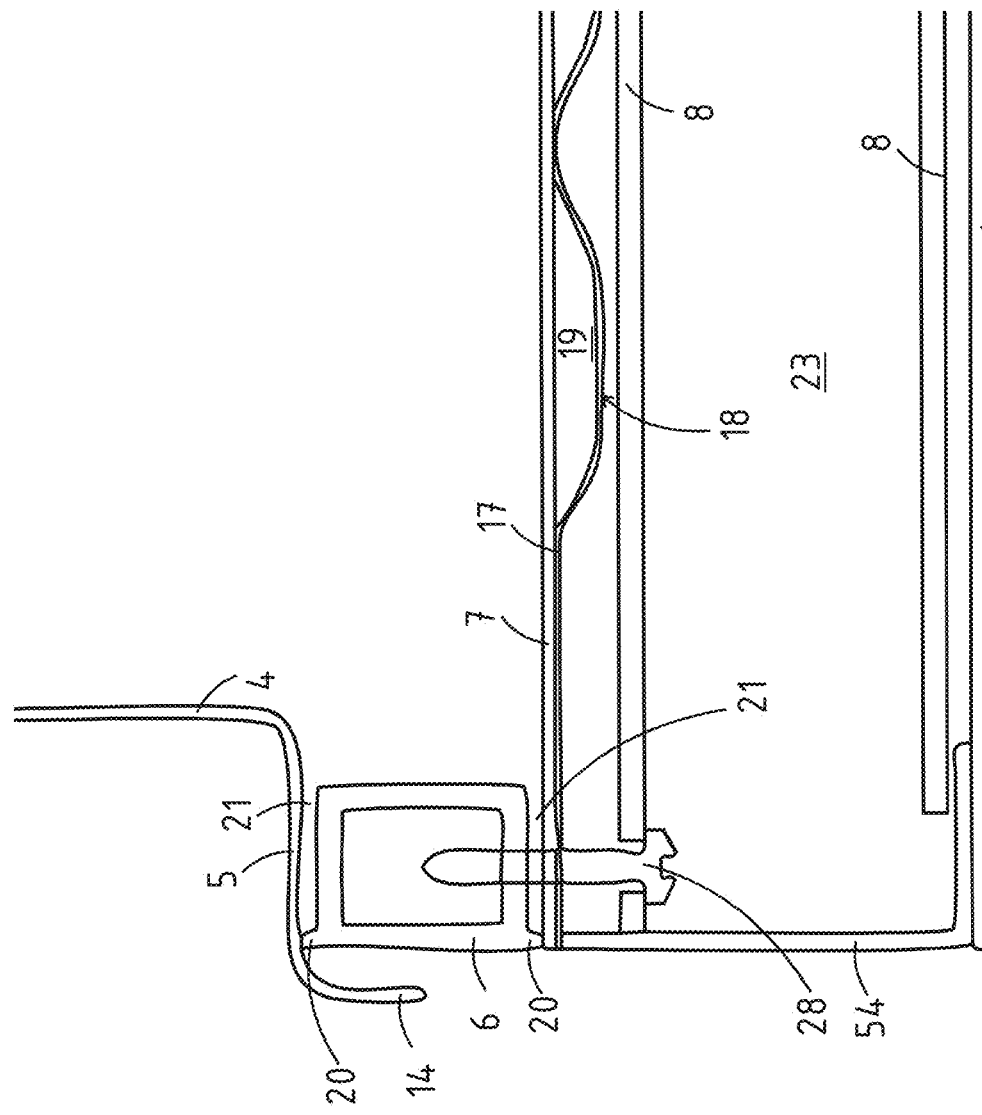
Figure 13A:
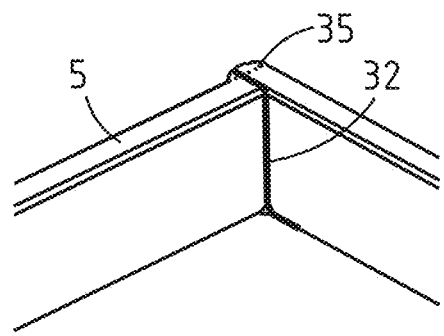
Figure 13B:
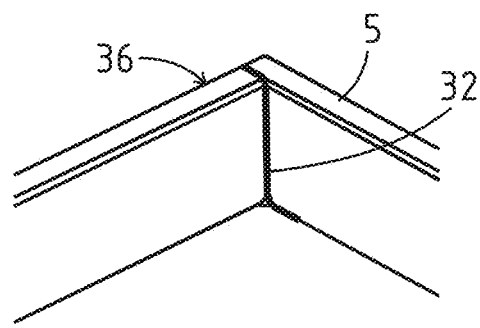
Figure 14:
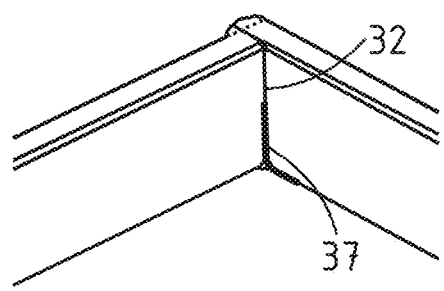
Figure 15:
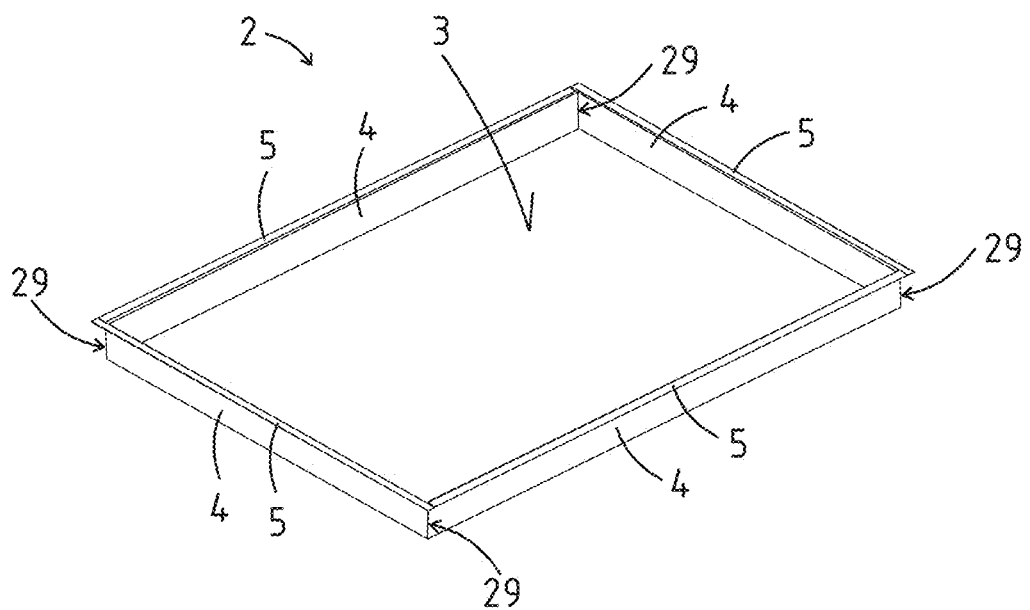
Figure 16:
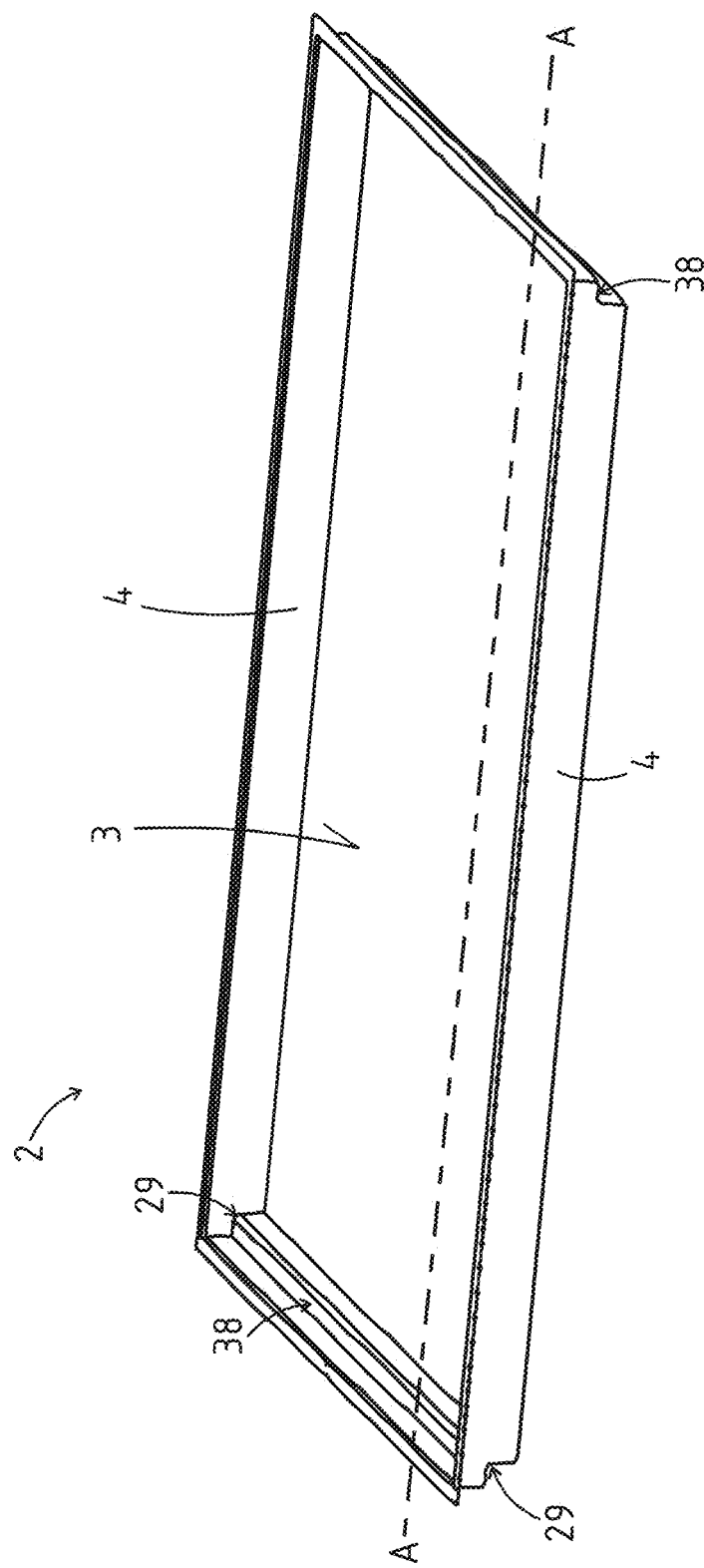
Figure 17:
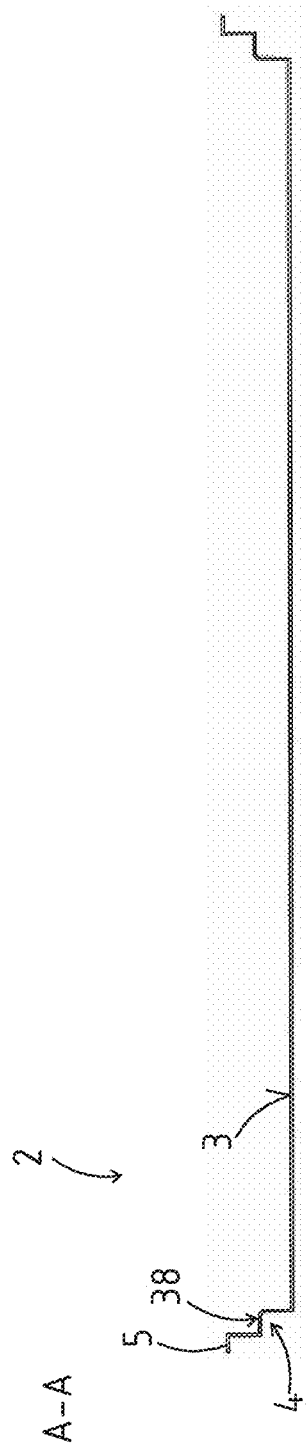
Figure 18:
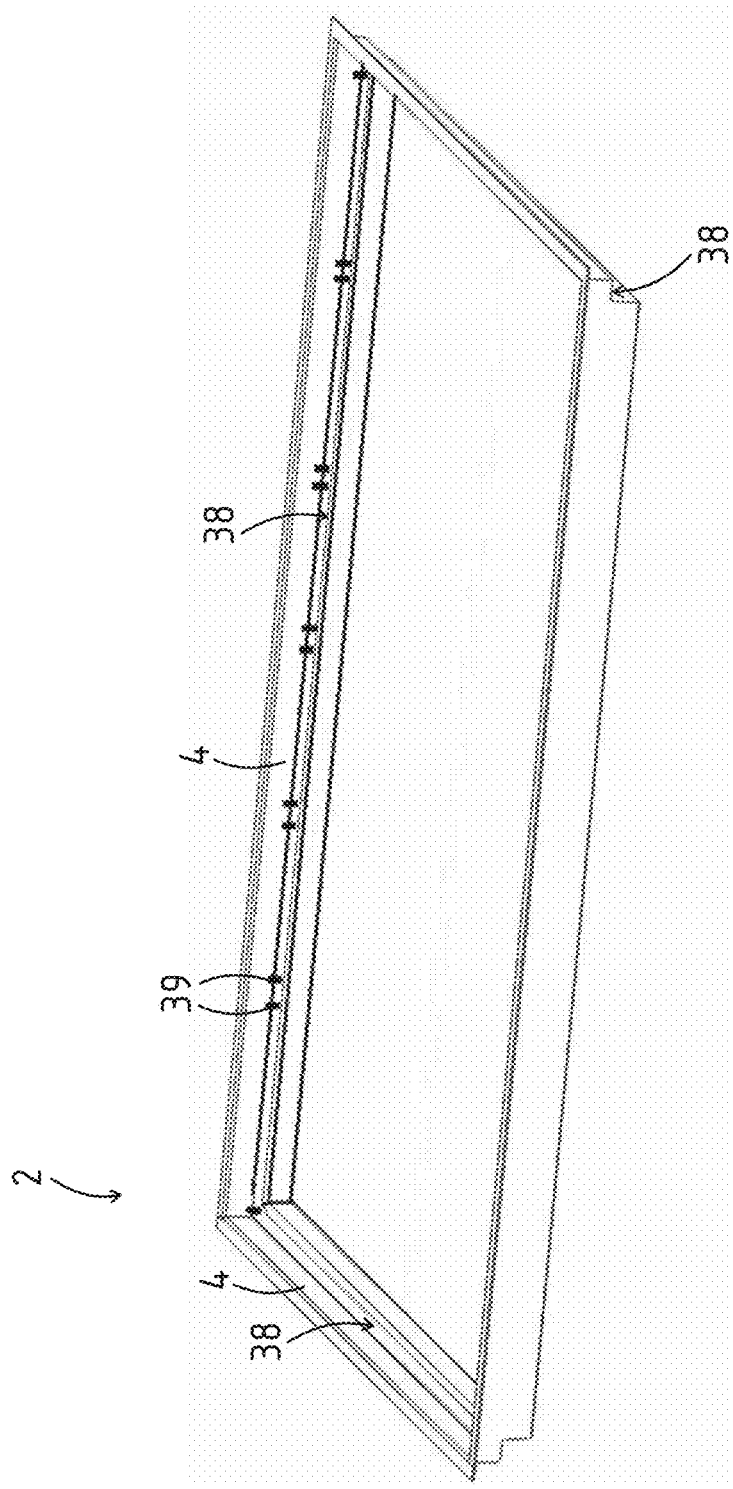
Figure 19:
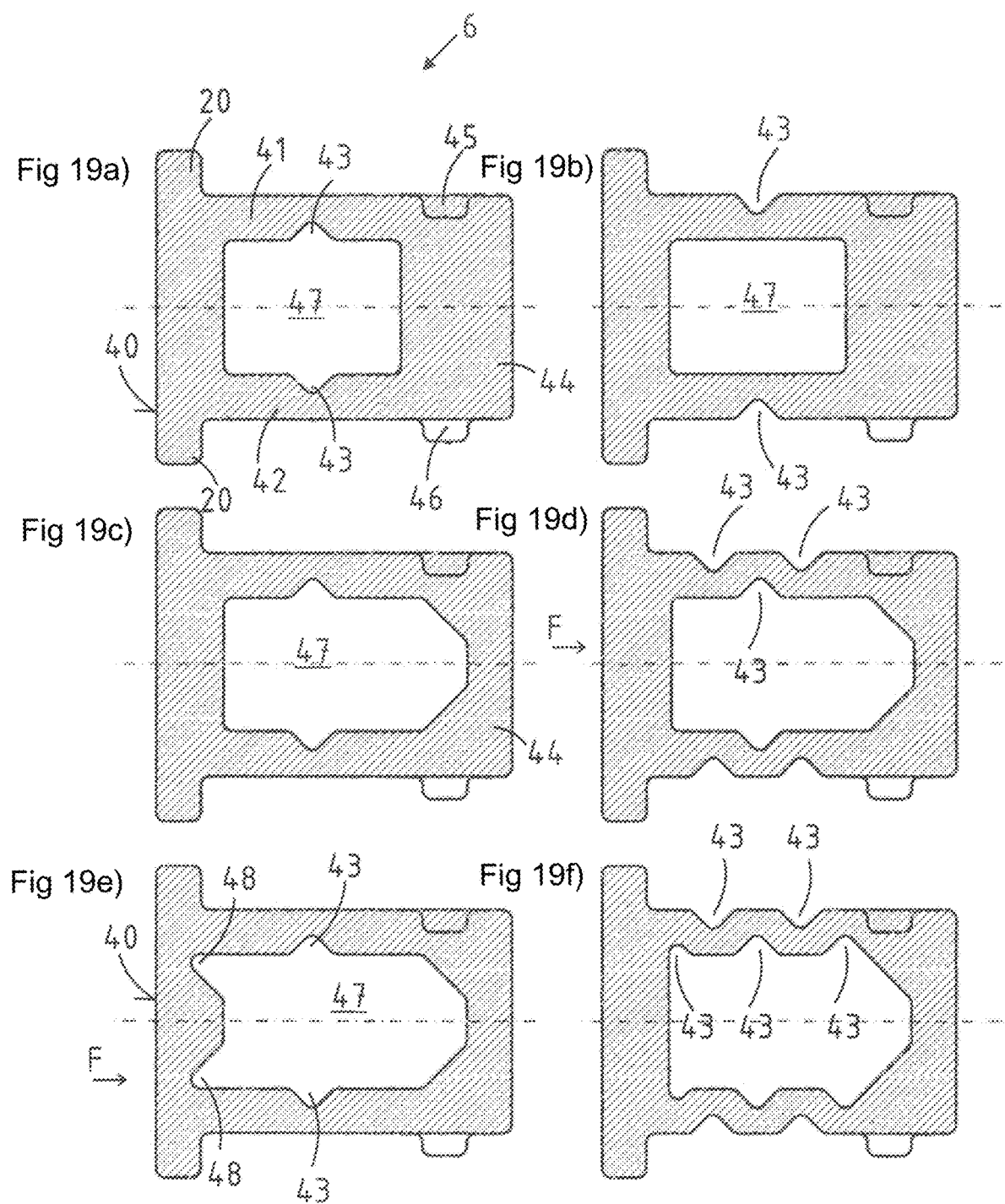
Figure 20:
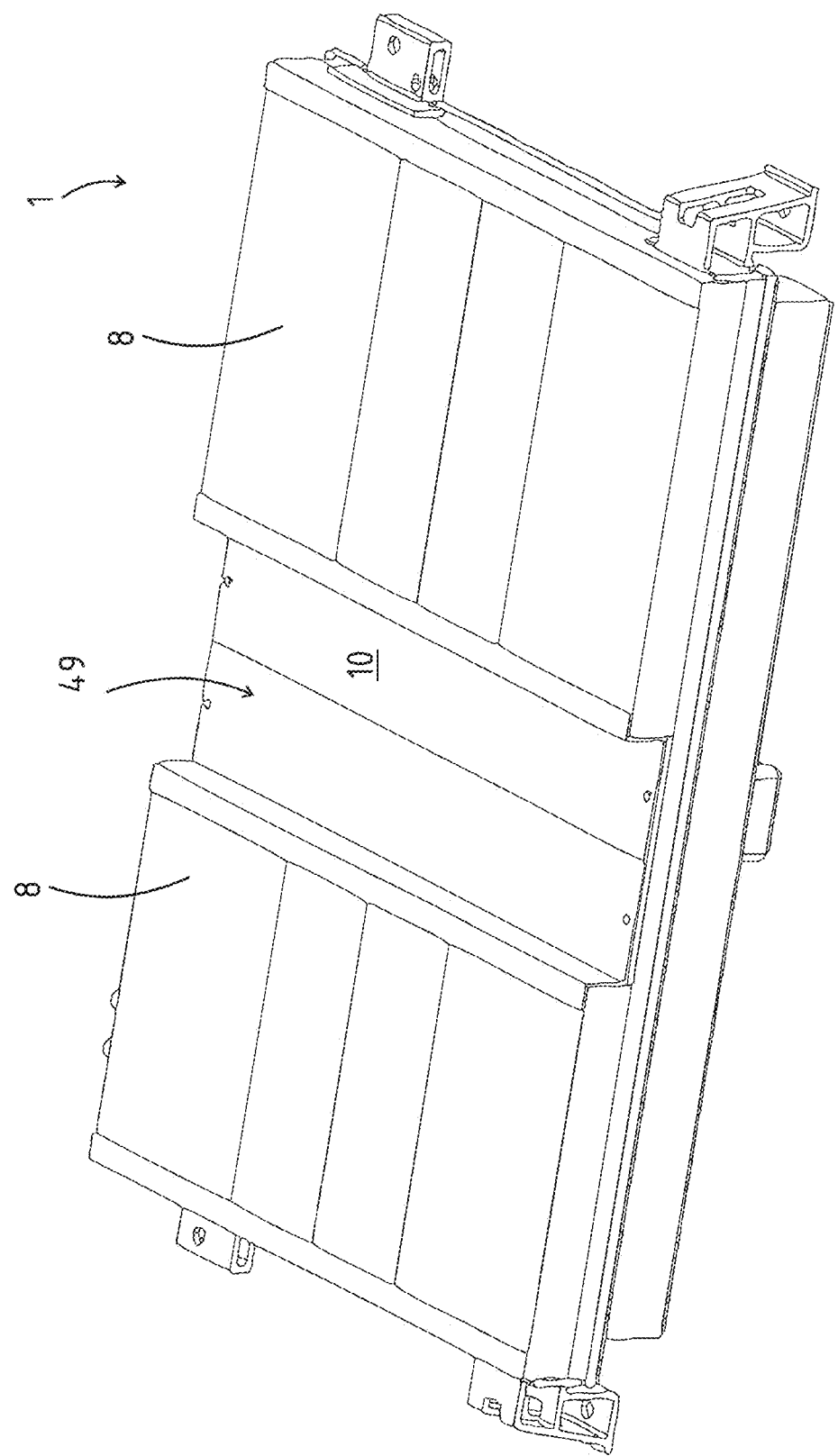
Figure 21:
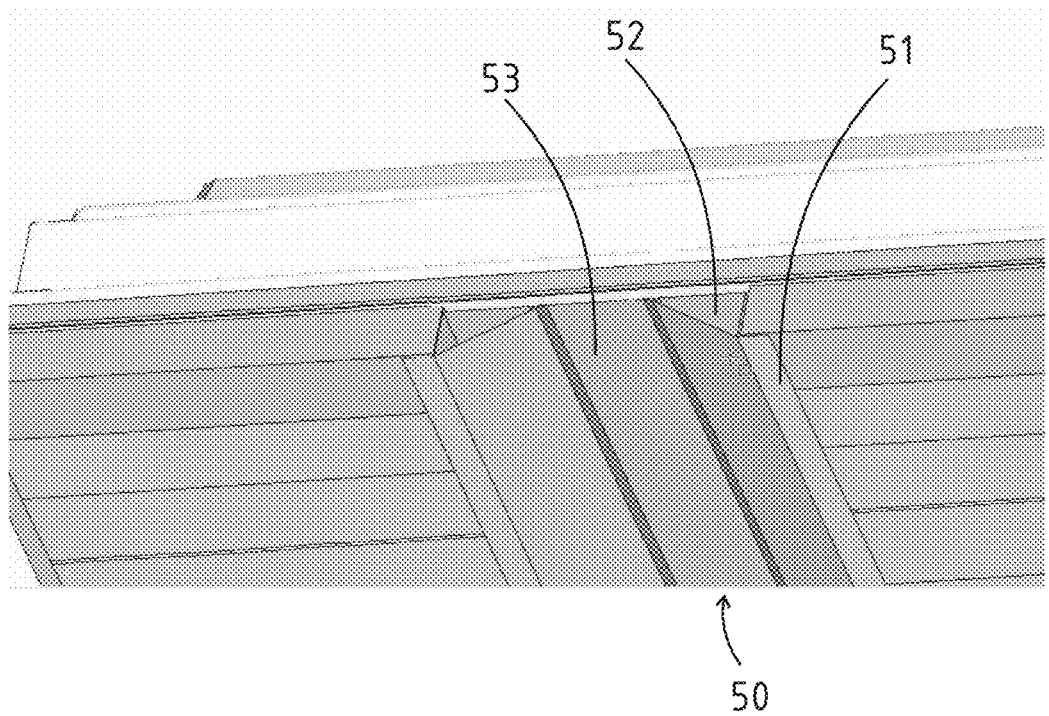
Figure 22:
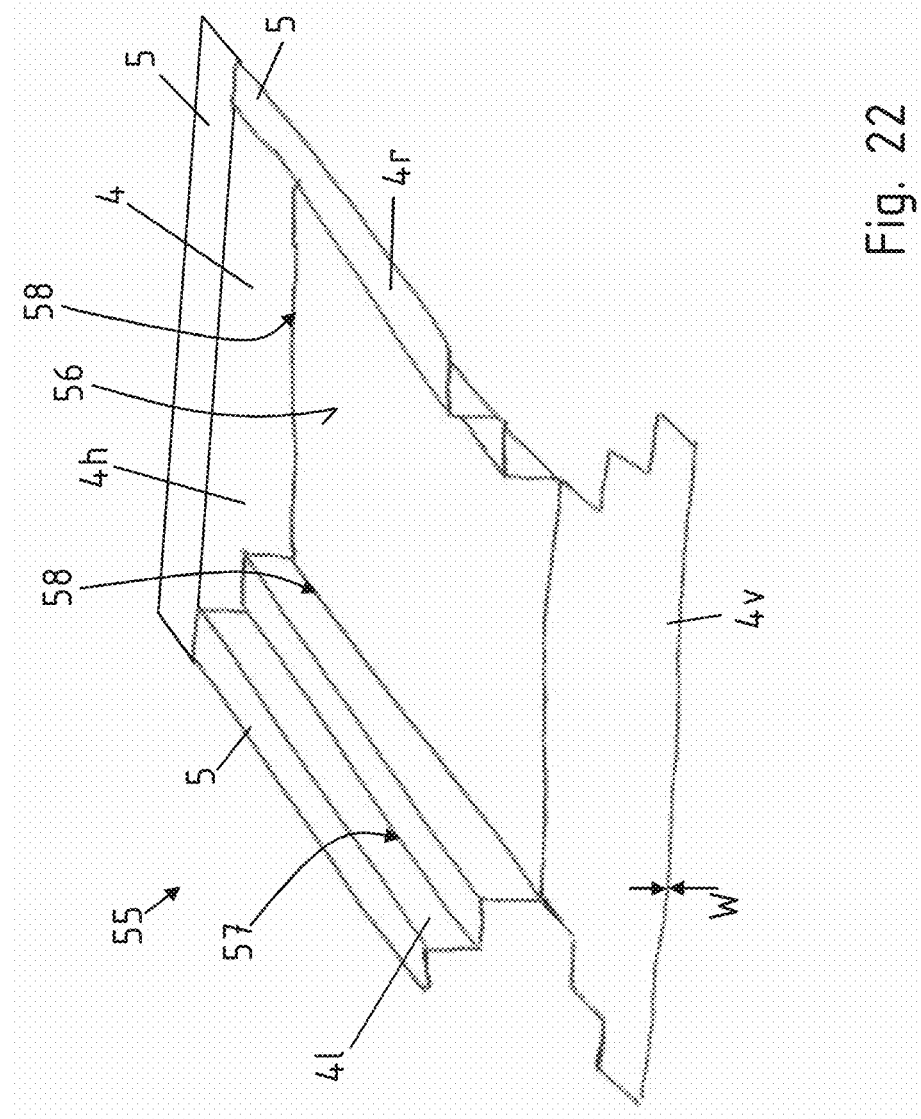

Further features, properties and aspects of the present invention are the subject matter of the following description. Preferred configuration variants are illustrated in schematic figures. Said figures serve for simpler understanding of the invention. In the figures:

FIG. 1 shows a battery support according to the invention in a perspective view, FIG. 2 shows a longitudinal section along the section line II-II from FIG. 1, FIG. 3 shows a cross-sectional view as per the section line III-III from FIG. 1, FIGS. 4 to 7 show a respective exploded illustration during the assembly process for a battery support according to the invention, FIG. 8 shows a perspective and combined sectional view of the base sheet with mounted frame and with hollow profiles arranged therebelow, FIG. 9 shows a detailed cross-sectional view of a boundary region through a battery support according to the invention, FIGS. 10 to 14 show the production of a welded connection in a corner region with an optional sealing bead, FIG. 15 shows a hood produced according to the invention, FIG. 16 shows a hood produced according to the invention, with an additional step in a side wall, FIG. 17 shows a longitudinal sectional view as per the section line A-A from FIG. 16, FIG. 18 shows an alternative configuration variant of a hood according to the invention, FIGS. 19a to 19f show different cross-sectional views of the peripheral frame, FIG. 20 shows a perspective view of a battery support from below, FIG. 21 shows a detail view of a battery support from below with a heat shield sheet, FIG. 22 shows the production of a tray as a fold tray with a step integrated in the side wall.

In the figures, the same reference signs are used for identical or similar components, even if a repeated description is omitted for reasons of simplicity.

FIG. 1 shows a battery support 1 according to the invention, which may also be referred to as a battery housing, in a perspective view. The battery support 1 has a hood 2, which is situated at the top with respect to the motor vehicle vertical direction Z. The hood 2 itself has a base 3 and a peripheral side wall 4 and a flange 5 which projects with respect to the side wall 4. The hood 2 thus engages over a peripheral frame 6, wherein the frame 6 bears on a base sheet 7. Hollow profiles 8 are arranged below the base sheet 7. The hollow profiles 8 extend substantially in the motor vehicle transverse direction Y and cover the battery support in an areal manner from below. In the middle, the hollow profiles 8 may also be interrupted by a middle profile 9. Below the middle profile 9, there may be arranged for example an exhaust tract (not illustrated in more detail) in a cut-out region 10. Fastening clips 11 are arranged laterally. The fastening clips 11 themselves may be produced for example as extruded profile components or else as cast components. The fastening clips 11 themselves are in particular screwed to the battery support 1 and serve for coupling to a vehicle (not illustrated in more detail). Screw connections 12 provided for this purpose are then coupled to the peripheral frame 6. FIG. 2 shows a longitudinal section along the section line II-II from FIG. 1. It can be seen here that the hood 2 is formed as a shaped component with the base 3 and the peripheral side wall 4, and, in turn from the side wall 4, a peripherally projecting flange 5 is formed. In addition, the flange 5 has a collar 14 or fold, which, in relation to the flange 5, is formed so as to be oriented in a manner substantially projecting at 90°. Batteries 16, indicated schematically, are arranged in an interior space 15 of the battery support 1. The batteries 16 are positioned on a base sheet 7. A cooling duct plate 17 is arranged below the base sheet 7 with respect to the motor vehicle vertical direction Z. The cooling duct plate 17 has formations 18 such that cooling ducts 19 for the passage of a fluid are formed between the base sheet 7 and the cooling duct plate 17.

The batteries 16 arranged on the base sheet 7 thus emit generated heat to the base sheet 7, which heat is in turn removed by the cooling medium in the cooling ducts 19. The base sheet 7 itself is then coupled to the frame 6. The frame 6 itself has, at the bottom and at the top, in each case one spacing boss 20. A gap 21 which is formed between the frame 6 and the base sheet 7 can thus be filled with additional sealant and/or adhesive. An electrically conductive contact between the frame 6 and the base sheet 7 is provided by way of the spacing boss 20. The frame 6 also has a spacing boss 20 with respect to the flange 5 of the hood 2. A gap 21 which is formed here can also be filled with a adhesive and/or sealant.

The hollow profiles 8 are furthermore arranged below the base sheet 7, or the cooling duct plate 17, with respect to the motor vehicle vertical direction Z. The hollow profiles 8 extend, with the course of their hollow chambers 23, in the motor vehicle transverse direction Y. The hollow profiles 8 may be coupled to one another via a tongue and groove plug-in system 22. The hollow profiles 8 thereby areally cover approximately all of the base. In this way, the hollow chambers 23 form a space for damping shocks or forces coming from below with respect to the motor vehicle vertical direction Z in the case of a setting-down on an underlying surface, or for reducing the kinetic energy, in order to protect the batteries 16 from damage. It is furthermore also possible for an underride guard plate 24 to be arranged below the hollow profiles 8. This may be produced for example from aluminum. In this way, this has low corrosion properties and a low inherent weight, and is simple to produce in terms of shaping technology.

The hood 2 itself may have a cutout 25. Then, an additional device hood 26 is further arranged on the cutout 25. Said device hood may be welded for example, or coupled in some other way, to the base 3.

FIG. 3 shows a cross-sectional view as per the section line III-III from FIG. 1. Here too, the individual batteries 16 bearing on the base sheet 7 can be seen, wherein generated heat is then removed below the base sheet 7 via cooling ducts 19. The hollow profiles 8 do not extend in the motor vehicle transverse direction Y continuously but are interrupted by the middle profile 9. An exhaust tract (not illustrated) of an internal combustion engine may be arranged for example in the cut-out region 10 of the middle profile 8. It can be seen in each case that the frame 6 is peripheral at the outside and couples the flange 5 of the hood 2 and the base sheet 7 to one another.

Figure 4:
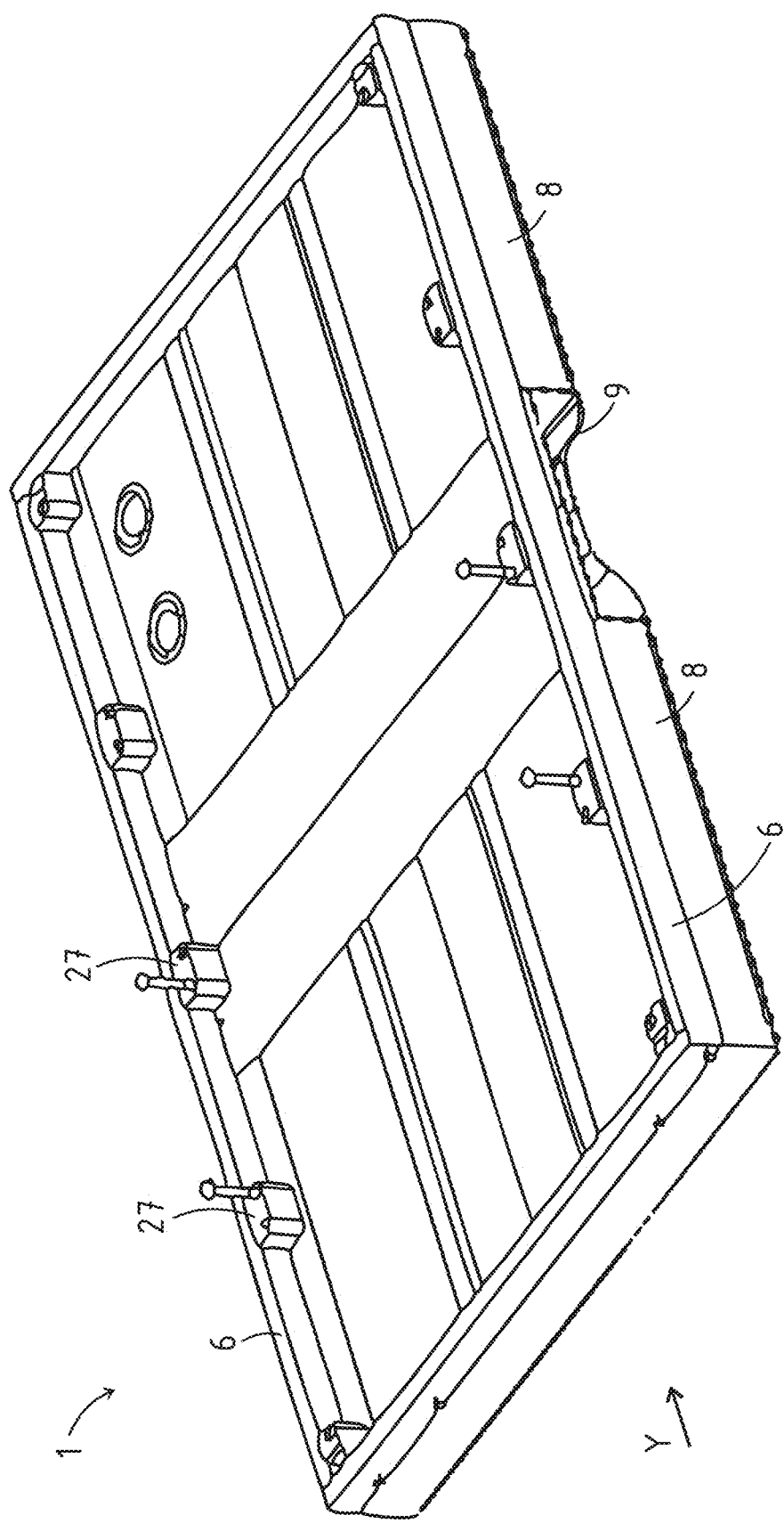

FIG. 4 shows an assembly process for a battery support 1 according to the invention. Firstly, the hollow profiles 8 extending in the motor vehicle transverse direction Y and the middle profile 9 are arranged. Then, a peripheral frame 6, as illustrated, is mounted thereon. Fastening profiles in the form of receiving blocks 27 are arranged in the frame 6 itself for the purpose of coupling to batteries (not illustrated in more detail).

Figure 5:
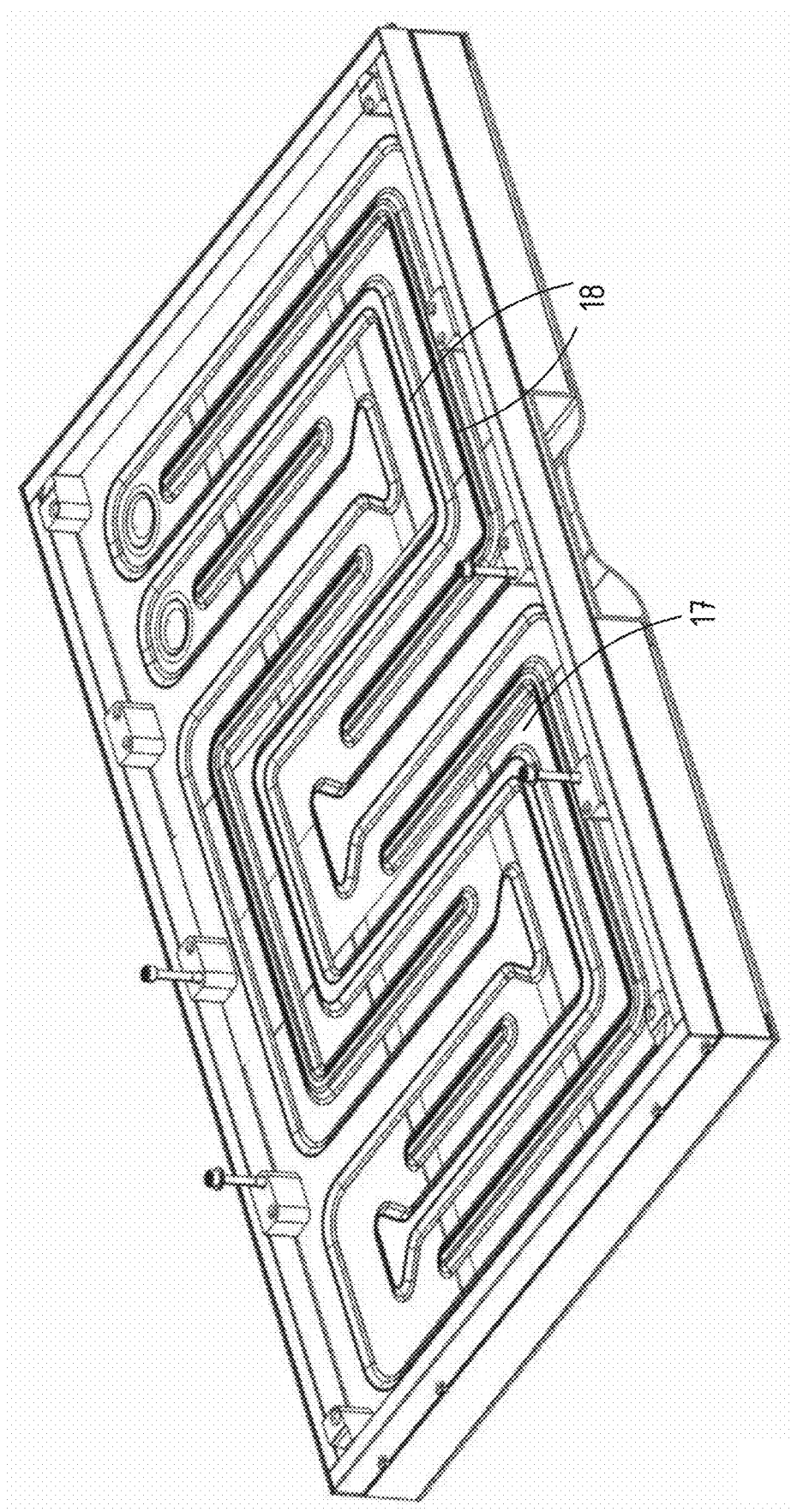

FIG. 5 shows a perspective view in a further manufacturing step, wherein here the cooling duct plate 17 is mounted and the formations 18 are arranged therein in a linear or duct-shaped manner.

FIG. 6 shows the base sheet 7 arranged thereon, said base sheet forming a planar underlying surface for receiving batteries 16, which are illustrated in FIG. 7. It can be seen that the illustrated battery 16 is coupled to the receiving blocks 27.

FIG. 8 shows a sectional view once again for this purpose. The cooling ducts 19 formed between the base sheet 7 and the cooling duct plate 17 and the hollow profiles 8 arranged below the cooling ducts 19 can be seen.

FIG. 9 shows a detail view. The peripheral frame 6, with its spacing bosses 20 which protrude at the top and at the bottom with respect to the motor vehicle vertical direction Z, can be seen. The gaps 21 which are formed in between can be filled with a sealant and/or adhesive (not illustrated in more detail). The hollow profiles 8 are, by way of screws 28, screwed to the frame 6 from below in a manner passing through the base sheet 7 and the cooling duct plate 17. A lateral cover plate 54 which laterally closes off the hollow profiles 8 can then additionally be arranged here.

FIG. 15 shows a hood 2 in a partial view from below in a region of a corner which is formed. Thus, with respect to the plane of the drawing, an opening faces upward. Firstly, a pre-cut sheet-metal blank (not illustrated) has been provided, and then the hood 2 has been produced as a fold component through shaping of the pre-cut sheet-metal blank. For this purpose, the side walls 4 and the flanges 5 are in each case folded or subjected to edge bending and then come into abutment in the region of the corner 30 as per FIG. 10. These are not yet connected, however. A peripheral side wall 4 is formed by four side walls 4, or side wall portions, which in each case meet in a corner region 29. A flange 5 laterally projects peripherally at the outside with respect to the side walls 4.

Figure 10:
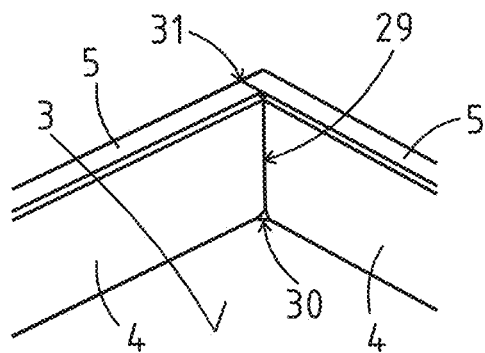

According to the invention, the tray is formed or produced as a fold tray. FIG. 10 shows such a corner region 29 formed after the folding. Sealingly welding said corner region 29 and also in particular the lower corner 30, which also applies equally to that part of the flange 5 projecting at the outside, is a problem.

Figure 11:
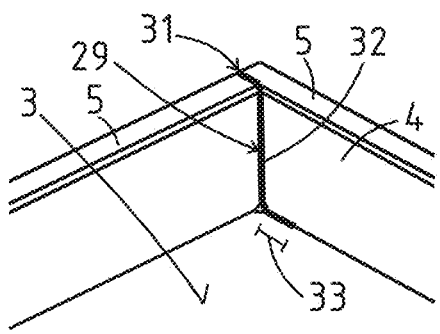

FIG. 11 shows here an approach according to the invention. A weld seam 32 is drawn from the inside, not starting in the corner 30 but starting with an offset 33 from the corner 30 in a transition region from the base 3 to the side wall 4, in a continuous manner over the corner 30 and the corner region 29 and extends as far as the outer part of the flange 5. The weld seam is produced by means of fusion welding, in particular arc welding, such as for example MIG welding.

Figure 12:
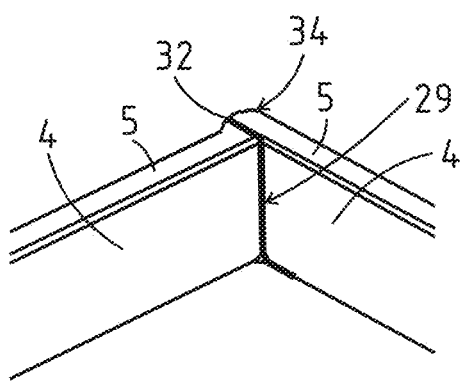

FIG. 12 shows a further configuration variant of the present invention. Firstly here, that region of the flange 5 projecting at the outside of both side walls 4 is widened outwardly, or formed to project further, in the region of the corner connection. The weld seam 32 is then drawn through continuously as far as the outer end 34 of the outwardly further projecting flange 5.

Subsequently, the flange 5 is, as per FIGS. 13a and 13b, mechanically worked along a cutting line 35 by severing, or by some other abrasive or mechanical process, such that the result is a smooth outer peripheral edge 36 of the flange 5, which is of high quality in terms of connection particularly in the region of the weld seam of the flange 5. Weld seam defects, in particular in the flange region, are thereby avoided according to the invention.

FIG. 14 shows a supplementary configuration variant. Here, in addition, a sealing bead 37 is additionally applied from the inside, at least in length portions, to the weld seam 32.

FIG. 16 shows a further configuration variant of an independent concept of the invention. Here, a hood 2 of a battery support 1 is illustrated. This is likewise produced as a fold component and has a base 3 and a peripheral side wall 4. The side wall 4 has four sides, or side wall portions, which are joined to one another in a respective corner region 29 after the folding process. According to the invention, it is now the case that, at two opposing side walls 4, on the left and right with respect to the plane of the drawing, in each case one additional step 38 is integrally formed therewith.

This can also be easily seen once again in the sectional illustration, as per the section line A-A in FIG. 17. The step 38 allows a possibility for the assembly of battery modules to be realized in the hood 2 or tray. Furthermore, the step 38 reinforces the corresponding side wall 4. The embodiment according to the invention of a step 38, 57 in the side wall 4 may be combined with each of the above-described corner connection techniques.

FIG. 18 shows a further configuration variant of the present invention. Here, the step 38 is formed on three sides of the peripheral side wall 4. Punched nuts 39 are arranged on the step 38, or introduced therein, such that batteries or battery modules (not illustrated in more detail in FIG. 18) can be fastened in the tray or hood 2.

FIGS. 19a to 19f show different cross-sectional views of the peripheral frame 6. FIG. 19a shows the frame 6 in one cross-sectional view. Spacing bosses 20 arranged both at the top and at the bottom can be seen. The spacing bosses 20 may also be referred to as a plate boundary. An outer impact surface 40 which is oriented in the motor vehicle transverse or longitudinal direction X, Y, such that this makes contact first with an impacting object, is thus obtained. Predetermined buckling points 43 are formed in a top chord 41 and a bottom chord 42. Here, the predetermined buckling points 43 indicate a corresponding deformation. At an upright chord 44 arranged toward an inner region of the battery tray, it is optionally possible for a groove 45 and a tongue 46 to be formed. It would also be possible for a further spacing boss (not illustrated in more detail) to be formed here. It is in particular the case that the frame or the profile for producing the frame is produced by extrusion.

FIG. 19*b* shows an alternative configuration variant, in which the predetermined buckling points 43 are not arranged in the region of an inner hollow chamber 47 but are arranged at the outside.

FIG. 19*c* shows an alternative, in which the hollow chamber 47 is of larger form and the upright chord 44, in terms of its solidity, is of smaller form.

FIG. 19*d* shows an alternative configuration variant, with three hollow chambers 47 arranged in each top chord 41 and bottom chord 42. Two hollow chambers are arranged at the outside, and one hollow chamber 47 is arranged at the inside. In this way, the hollow chambers 47, in the event of an impact in the force direction F, serve as a trigger to make possible a targeted deformation or folding.

As per the configuration variant of FIG. 19*e*, the hollow chamber 47 is furthermore formed such that two tips 48 in the direction of the impact surface 40 extends in the direction of the impact surface 40 with a tip 48 arranged at the top and at the bottom in each case. Here too, targeted deformation in the event of an impact in the force direction F can be influenced.

FIG. 19*f* shows an alternative configuration variant, in which a total of five predetermined buckling points 43 are introduced into the top chord 41 and the bottom chord 42 in each case. In this way, the fold behavior can be influenced in a targeted manner. The frame 6 thus works according to the principle of a crash box, in particular in the event of a lateral intrusion of objects into the battery tray.

FIG. 20 shows the overall system of the battery support from below. In the cut-out region 10, which may also be referred to as a middle tunnel 49, it is thus possible to guide an exhaust tract (not illustrated in more detail).

As per FIG. 21, a heat shield sheet 50 is arranged in said middle tunnel 49. The heat shield sheet 50 itself engages with a flange 51 over the respective hollow chambers 8. The heat shield sheet 50 is then formed in the region of the middle tunnel 49 with two cross-sectionally triangular hollow chambers 52 and a web 53 which connects these in the middle. The heat shield sheet 50 is designed in particular as an extrusion component. For this purpose, the web 53 preferably has a wall thickness of between 4 mm and 5 mm, in particular 4.5 mm, the triangular hollow chambers 52 have a wall thickness in the range of 3.5 mm to 4.5 mm, in particular of 4 mm, and the flange 51 has a wall thickness of 2.5 mm to 3.5 mm, in particular 3 mm. The heat shield sheet 50 thus simultaneously serves as a load path in the motor vehicle transverse direction Y.

FIG. 22 shows a tray 55 according to the invention. The tray 55 has a base sheet 56 and a peripheral side wall 4. The side wall 4 and the base sheet 56 are produced in an integral and materially uniform manner by cutting out a blank and subsequently folding the blank. The front side 4*v* of the side wall 4 and rear side 4*h* of the side wall 4 with respect to the plane of the drawing are, in themselves, each of smooth form. The left side 4*l* of the side wall 4 and the right side 4*r* of the side wall 4 with respect to the plane of the drawing are formed with an additional step 57. The step 57 is integrally formed and serves as a bearing surface for battery modules arranged in the tray 55 and/or serves for additional reinforcement. The front side 4*v* of the side wall 4 is folded upward in a subsequent manufacturing step and is then welded to the side 4*l* and side 4*r* in the corresponding corner regions formed. Also illustrated is a bend region 58 between the base sheet 56 and the side wall 4. According to the invention, said bend region is produced with a particularly small bend radius with respect to the thickness or wall thickness W of the sheet-metal blank. This is possible due to the folding technique.

The tray 55 illustrated here may also be used as a hood in the exemplary embodiment as per FIG. 1. In this case, it is furthermore conceivable that the steps reinforce the hood itself and, in the state of assembly, the battery support too. It would thus be possible for the hollow profiles of the frame 3 to be of lighter and/or thinner form, or even to be dispensed with entirely.

The invention claimed is:

1. Battery support for an electric motor vehicle, having a tray for holding batteries, with a base and a peripheral side wall and a cover, wherein the cover is formed as a hood and the peripheral side wall is formed by a peripheral frame composed of hollow profiles, wherein the frame is coupled to a base, wherein the hood, in the closed state, is mounted on the hollow profile, and a cooling system is formed below the base, and in that a protective base is arranged below the base and below the cooling system.

2. Battery support according to claim 1, wherein the hood is produced from a metallic material as a cast component or as a fold component from a sheet metal.

3. Battery support according to claim 1, wherein the cooling system is formed by a cooling duct plate which is coupled to the base in a fluid-tight manner such that cooling ducts for the passage of a fluid are formed between the cooling duct plate and the base.

4. Battery support according to claim 1, wherein the hollow profile of the frame is screwed to the base, with a sealing compound being introduced.

5. Battery support according to claim 1, wherein the hollow profile has a protruding web at its top side, and/or in that the hollow profile has a protruding web at its bottom side, such that, when the hollow profile is coupled to the hood and/or the hollow profile is coupled to the base, a defined gap remains.

6. Battery support according to claim 1, wherein the base and the cooling duct plate are screwed to the frame.

7. Battery support according to claim 1, wherein the protective base are formed from hollow profiles, wherein preferably multiple hollow profiles are plugged one into the other by means of a tongue and groove plug-in system.

8. Battery support according to claim 1, wherein a cover plate is arranged laterally with respect to the protective base.

9. Battery support according to claim 1, wherein an underride guard plate is arranged below the hollow profiles of the protective base.

10. Battery support according to claim 1, wherein holders for coupling to and/or receiving batteries are attached to the frame at the inside.

* * * * *